United States Patent [19]

Aoike et al.

[11] 4,395,659
[45] Jul. 26, 1983

[54] POWER SUPPLY DEVICE

[75] Inventors: Nanjou Aoike; Kenichi Inui, both of Yokohama; Yasunobu Koshimura, Tokyo, all of Japan

[73] Assignee: Toshiba Electric Equipment Corporation, Tokyo, Japan

[21] Appl. No.: 240,943

[22] Filed: Mar. 5, 1981

[30] Foreign Application Priority Data

Mar. 10, 1980 [JP] Japan .................................. 55-29875

[51] Int. Cl.³ .............................................. H05B 37/02
[52] U.S. Cl. ................................. 315/209 R; 315/222; 315/278; 315/307
[58] Field of Search ................ 315/209, 222, 278, 307

[56] References Cited

U.S. PATENT DOCUMENTS 3,302,060 1/1967 Blok et al. ............................ 315/307
4,017,785 4/1977 Perper ................................... 315/224
4,127,795 11/1978 Knoll ................................ 315/209 R
4,259,616 3/1981 Smith ................................... 315/278

Primary Examiner—Harold A. Dixon
Attorney, Agent, or Firm—Oblon, Fisher, Spivak, McClelland & Maier

[57] ABSTRACT

An output transformer for an inverter driven by a pulsating voltage obtained through the full wave rectification of a low frequency alternating current voltage is provided with an auxiliary winding, and a high frequency voltage obtained from the auxiliary winding is rectified to obtain a voltage for charging a capacitor. The voltage across the capacitor is used as an auxiliary voltage together with the pulsating voltage for driving the inverter. The circuit for charging the capacitor includes a current limiting inductor having first and second coil sections, through which the charging current flows alternately in opposite directions depending upon the polarity of the high frequency voltage.

5 Claims, 7 Drawing Figures

POWER SUPPLY DEVICE

This invention relates to a power supply device, which has an inverter driven by a pulsating voltage obtained through the rectification of a low frequency alternating voltage and is used, for instance, for operating a discharge lamp.

The power supply device used for operating a discharge lamp, i.e., the discharge lamp operating device, is usually constructed to operate the discharge lamp by using a high frequency operating voltage for size and weight reduction and lamp efficiency increase. As the high frequency voltage, a voltage at 100 kHz, for instance, is obtained from an inverter, which is driven by using a pulsating voltage obtained through the rectification of a commercial low frequency voltage, for instance at 50 Hz.

U.S. Pat. No. 4,017,785 discloses a discharge lamp operating device using a high frequency voltage, as shown in FIG. 1 of the patent. In this device, discharge lamps are driven by a high frequency voltage at 20 kHz which is generated from an inverter oscillator including a transformer, an inverter transistor and a feedback winding. The device further comprises an auxiliary DC voltage source which includes the secondary winding of the transformer, a diode and a capacitor, and an auxiliary DC output voltage from which is supplied to a positive DC input terminal of the inverter. Thus, the fluctuation of the main DC supply voltage is compensated for, so that the reduction of the lamp efficiency particularly in the neighborhood of the zero volt of the pulsating voltage from the main DC supply can be prevented.

In this circuit device, however, since little electric charge is stored in the capacitor at the time of the closure of the low frequency power source switch, excessive rash current is caused to flow between the collector and emitter of the inverter transistor. Thus, the inverter transistor becomes in an overloaded state, and therefore breakdown of the inverter transistor at this time is prone. In order to prevent this, it may be thought to connect a current limiting reactance element in series with the diode in the auxiliary supply circuit. However, since current can flow through the diode only in one direction, the afore-mentioned current limiting reactance element acts as a commonly termed DC reactor. In other words, with the closure of the low frequency power source switch, excessive rash current flows through the current limiting reactance element only in one direction for a period of several cycles of the high frequency voltage from the start of oscillation of the inverter. As a result, magnetic saturation of the magnetic core of the reactance element results to suddenly reduce the impedance thereof. When this takes place, the reactance element no longer acts as the current limiting reactance, so that large current flows through the transistor forming the inverter to cause breakdown of the transistor. This drawback may be prevented by using a current limiting reactance element having a large core. Doing so, however, increases the weight as well as the size and cost of the discharge lamp operating device.

An object of the invention, accordingly, is to provide a power supply device, which can decrease the amount of a rash current at the time of the closure of the power source switch and can prevent the breakdown of a transistor forming the inverter by the rash current and is small in size, light in weight, inexpensive and capable of use as, for instance, a discharge lamp operation.

In one aspect of the invention, this objective is achieved by connecting a current limiting inductor, which is connected such that the rash current at the time of the closure of the power source switch flows into a center tap of a coil wound about its magnetic core so that current flows from the center tap alternately toward one end of the coil for one half cycle of the inverter output of one polarity and toward the other end of the coil for the other half inverter output cycle of the opposite polarity, and which thus acts as an AC reactor.

This invention can be more fully understood from the following detailed description when taken in conjunction with the accompanying drawings, in which.

Figure 1:
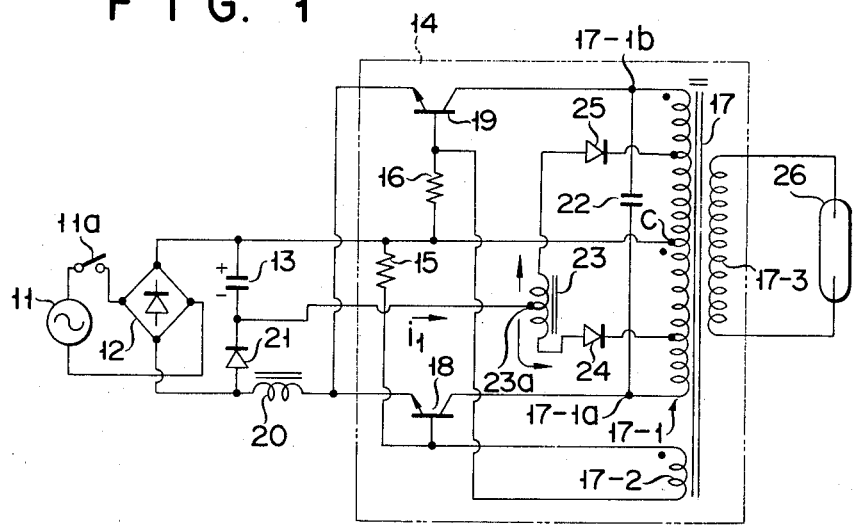
FIG. 1 is a circuit diagram showing an embodiment of the invention applied to a discharge lamp operating device.

Referring now to FIG. 1, one terminal of a 50 Hz commercial AC power source 11 is connected through a power source switch 11a to one AC input terminal of a full wave rectifier 12 formed by four diodes. The other terminal of the power source 11 is connected to the other AC input terminal of the full wave rectifier 12. A positive pulsating output terminal of the full wave rectifier 12 is connected to the positive terminal of a capacitor 13 and also to one end of resistors 15 and 16 and a center tap C of the primary winding 17-1 of a transformer 17 in an inverter 14. The resistors 15 and 16 are connected at the other end to the base of respective inverter transistors 18 and 19, which have their collectors respectively connected to the opposite ends 17-1a and 17-1b of the primary winding 17-1. The emitters of the transistors 18 and 19 are commonly connected to one end of a constant current inductor 20, the other end of which is connected to the anode of a diode 21 and also to the negative pulsating output terminal of the full wave rectifier 12. The cathode of the diode 21 is connected to a negative terminal of the capacitor 13. A resonant capacitor 22 is connected across the terminals 17-1a and 17-1b of the primary winding 17-1 of the transformer 17.

The juncture between the negative terminal of the capacitor 13 and the cathode of the diode 21 is connected to the center tap 23a of a current limiting inductor 23. The inductor has one end connected through a forward-connected diode 24 to an intermediate tap between the center tap C and the end 17-1a of the primary winding 17-1 and the other end connected through a forward-connected diode 25 to an intermediate tap between the center tap C and the other end 17-1b of the winding 17-1. The transistors 18 and 19 have their bases respectively connected to the opposite ends of a control winding 17-2. A secondary winding 17-3 of the transformer 17 has its opposite ends connected to the respective electrodes of a discharge lamp 26 such as a mercury lamp.

The operation of the circuit shown in FIG. 1 will now be described. When the power switch 11a is closed, the 50 Hz AC voltage is rectified by the full wave rectifier 12, and the resultant pulsating voltage is coupled to the inverter 14. At this time, one of the inverter transistors 18 and 19, for instance transistor 18, is first triggered, causing current to flow from the center tap C of the primary winding 17-1 of the transformer 17 through the end 17-1a thereof and transistor 18 into the constant current inductor 20. By the magnetic flux set up by the current at this time, a voltage is produced across the control winding 17-2 such that the base of the transistor 19 is at a positive potential and the base of the transistor 18 is at a negative potential. As a result, the transistor 18 is turned off, while the transistor 19 is triggered. Consequently, current is now caused to flow from the center tap C through the end 17-1b and transistor 19 into the constant current inductor 20. By the magnetic flux set up by the current flowing from the center tap C to the terminal 17-1b the polarity of the voltage generated across the control winding 17-2 is inverted, thus triggering the transistor 18 again and turing off the transistor 19 again. In this way, while the pulsating voltage corresponding to one half wave of the commercial power source 11 is applied to the inverter 14, alternate triggering and turning-off of the transistors 18 and 19 is repeated, whereby a high frequency voltage at, for instance, 100 kHz is generated across the secondary winding 17-3 of the transformer 17 to operate the discharge lamp 26.

Figure 2A:
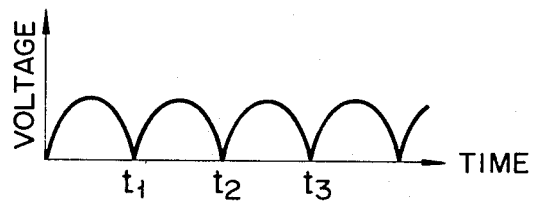
FIGS. 2A through 2C show voltage waveforms for illustrating the operation of the embodiment of FIG. 1.
Figure 2B:
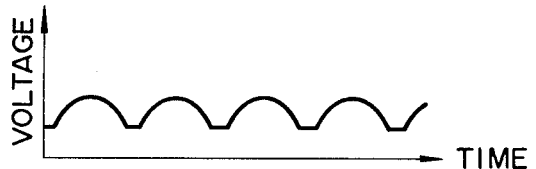
Figure 2C:
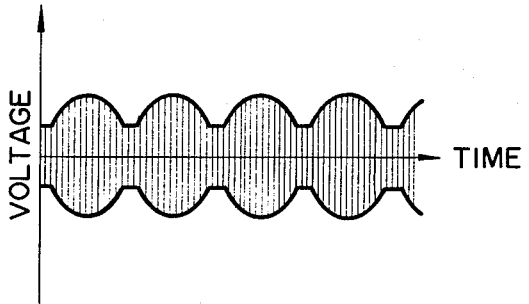

During the oscillation of the inverter 14 as described above, the voltage generated across the primary winding 17-1 between the center tap C and terminal 17-1a and that between the center tap C and terminal 17-1b are rectified by the respective diodes 24 and 25, so that the capacitor 13 is charged to the illustrated polarity. The voltage across the capacitor 13 is added to the pulsating output voltage of the rectifier 12 in the neighborhood of the zero (at instants $t_1$, $t_2$, ... in FIG. 2A) by the action of the switching diode 21. Thus, the drive voltage applied to the inverter 14 has a waveform substantially as shown in FIG. 2B, and the envelope of the high frequency voltage supplied from the inverter 14 to the discharge lamp 26 is as shown in FIG. 2C. When high frequency voltage is always set above the discharge stop voltage of the discharge lamp 26, for instance, the lamp efficiency can be greatly improved.

Figure 3:
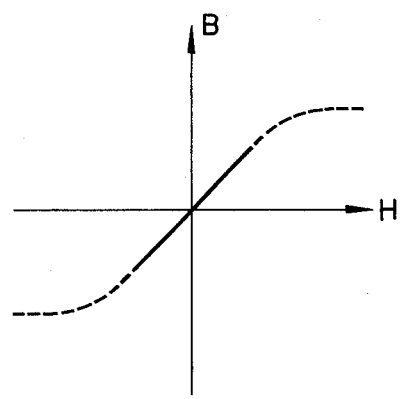
FIG. 3 is a graph showing the B-H curve of the current limiting reactance element shown in FIG. 1.

Before the closure of the source switch 11a, the capacitor 13 is not charged, so that at the time of the closure of the power source switch 11a excessive rash current $i_1$ is going to flow through the capacitor 13. This rash current $i_1$ flows from the center tap 23a of the inductance coil 23 through the diode 24 into the transistor 18 when the transistor 18 is "on" while it flows from the center tap 23a through the diode 25 into the transistor 19 when the transistor 19 is "on." Thus, the direction of the magnetic flux passing through the core of the current limiting inductance 23 is inverted for every half cycle of the high frequency output voltage of the inverter 14, and the B-H curve of the core of the inductor 23 at this time is substantially linear as shown by the solid line in FIG. 3. It will be seen that the current limiting inductor 23 thus acts as an AC reactor which always offers high impedance to provide sufficient current limiting action with respect to the rash current $i_1$ caused at the time of the closure of the power source switch 11a, thus effectively preventing the breakdown of the transistors 18 and 19.

Figure 4:
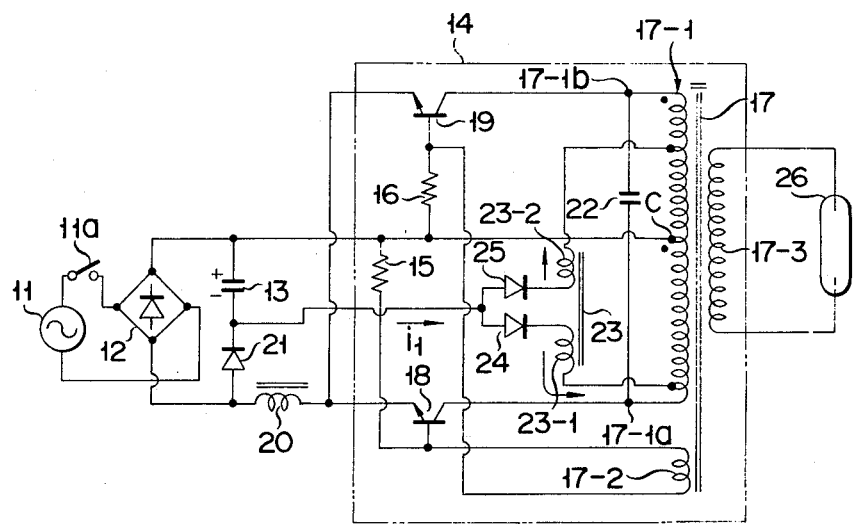
FIG. 4 is a circuit diagram showing another embodiment of the invention.

In the above embodiment of FIG. 1, the intermediate or center tap 23a of the inductor 23 is connected to the juncture between the diode 21 and the capacitor 13. In this case, the diodes 24 and 25 are prone to be heated by the current flowing through them. This heating of the diodes is alleviated in an embodiment shown in FIG. 4 by connecting in common these two diodes using a heat radiator plate. In FIGS. 1 and 4, like parts are designated by like reference numerals. In the embodiment of FIG. 4, the juncture between the negative end of capacitor 13 and the cathode of switching diode 21 is connected to the common juncture between the anodes of diodes 24 and 25. The common anode juncture is constituted by a heat radiator plate (not shown). The cathode of the diode 24 is connected to one end of an inductor coil 23-1 forming an inductor 23, and the other end of the inductor coil 23-1 is connected to a tap of primary winding 17-1 of the transformer 17 formed near the end 17-1a of the primary winding 17-1. The cathode of the other diode 25 is connected to one end of the other inductor coil 23-2 forming the inductor 23, and the other end of the inductor coil 23-2 is connected to an imtermediate tap between the other end 17-1b and center tap C of the primary winding 17-1. The inductor coils 23-1 and 23-2 are wound about a single core and magnetically coupled to each other such that they have practically the same inductance characteristics. Thus, the magnetic fluxes set up by the current flowing through the respective coils 23-1 and 23-3 are substantially the same in magnitude and are alternately inverted in direction. In other words, the inductor 23 is used as an AC reactor, and the same effects as in the embodiment of FIG. 1 can be obtained.

Figure 5:
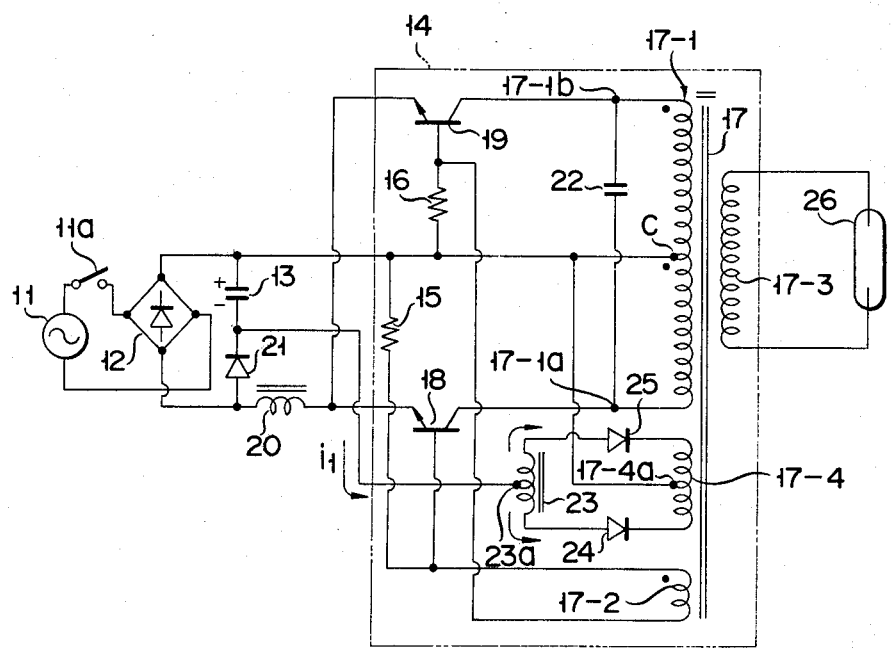
FIG. 5 is a circuit diagram showing a further embodiment of the invention.

While in the embodiments of FIG. 1 and FIG. 4, the capacitor 13 is charged by the voltage generated in the primary winding 17-1 of the transformer 17, it is also possible to permit the capacitor 13 to be charged by the voltage induced across a winding which is separately provided in the transformer 17, as shown in FIG. 5. In FIGS. 1 and 5, like parts are designated by like reference numerals. In the embodiment of FIG. 5 a separate secondary winding 17-4 is provided in the transformer 17. The center tap 17-4a of the secondary winding 17-4 is connected to the center tap C of the primary winding 17-1. The secondary winding 17-4 has its opposite ends respectively connected to the cathodes of diodes 24 and 25, which have their anodes respectively connected to the opposite ends of current limiting inductor 23. The center tap 23a of the current limiting inductor 23 is connected to the juncture between the capacitor 13 and diode 21. The rest of the circuit construction is the same as in the embodiment of FIG. 1. In the embodiment of FIG. 5, like the embodiment of FIG. 1, the charging current $i_1$ of the capacitor 13 flows alternately from the center tap 23a of the inductor 23 to the diodes 24 and 25 in accordance with the on-off operation of the inverter transistors 18 and 19. Thus, the inductor 23 acts as an AC reactor and provides a satisfactory current limiting action with respect to the rash current into the capacitor 13 at the time of the closure of the power source switch 11a.

While in the embodiments of FIGS. 1, 4 and 5, the diode 21 is used as a switching element to supply auxiliary DC voltage to the main DC input voltage of the inverter 14, it is also possible to use such a controlled switching element as an SCR for the diode. By controlling the triggering timing of the SCR, the duration of discharge of the capacitor 13 can be adjusted freely.

What we claim is:
1. A power supply device comprising:

an AC source;

rectifying means for rectifying a voltage from the AC power source and producing a pulsating output voltage;

a high frequency wave generator connected to receive said pulsating output of the rectifying means to produce a high frequency output; and an auxiliary DC power source connected to rectify part of said high frequency AC output generated from the high frequency wave generator and store it and, when the pulsating output voltage of the rectifying means is at a low level, to discharge it so that an auxiliary voltage is supplied to the high frequency wave generator, in which said auxiliary DC power source comprises a feedback winding for generating a high frequency AC voltage which is part of an output of the high frequency wave generator, a capacitor connected at one terminal to a first intermediate tap of the feedback winding, a first series circuit of a first current limiting inductor and first rectifying diode connected between the other terminal of the capacitor and a second intermediate tap of the feedback winding, a second series circuit of a second current limiting inductor and second rectifying diode connected between the other terminal of the capacitor and a third intermediate tap of the feedback winding, and discharge control means connected in series with said capacitor and provided, together with said capacitor, at the input side of the high frequency wave generator, and wherein said the first and second current limiting inductors are wound on a common core.

2. A power supply device according to claim 1, wherein said first and second current limiting inductors of said current limiting inductor have one end connected to each other through a center tap into which the charging current to the capacitor flows and are wound about a single core.

3. A power supply device according to claim 1, wherein said auxiliary DC power source includes said first and second diodes having anodes of the diodes commonly connected to form a common juncture, the charging current to said capacitor flowing into said common junction, said first and second diodes having the cathodes connected to one end of said respective first and second current limiting inductors connected at the other terminal to the corresponding intermediate tap of the feedback winding.

4. A power supply device according to claim 3, wherein the anodes of said first and second diodes are coupled together by a common heat radiator plate.

5. A power supply device according to claim 1, wherein said high frequency generator includes inverter transistors and said output transformer which includes a primary winding for receiving the pulsating output of said first rectifying means and generating a high frequency output, a control winding for generating an on-off control voltage for said inverter transistors in said high frequency generator, an output winding for supplying said high frequency output to a load, and an auxiliary winding for supplying a charging output to said capacitor.

* * * * *